US009843765B2

(12) United States Patent
Karnalkar et al.

(10) Patent No.: US 9,843,765 B2
(45) Date of Patent: *Dec. 12, 2017

(54) INTEGRATED DEVICES FOR MULTIMEDIA CONTENT DELIVERY AND VIDEO CONFERENCING

(71) Applicant: AT&T Intellectual Property I, L.P., Atlanta, GA (US)

(72) Inventors: Anup D. Karnalkar, Allen, TX (US); Jyotindra N. Shah, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 66 days.

This patent is subject to a terminal disclaimer.

(21) Appl. No.: 13/689,360

(22) Filed: Nov. 29, 2012

(65) Prior Publication Data

US 2013/0088560 A1   Apr. 11, 2013

Related U.S. Application Data

(63) Continuation of application No. 11/932,514, filed on Oct. 31, 2007, now Pat. No. 8,330,789.

(51) Int. Cl.
*H04N 7/14* (2006.01)
*H04N 7/15* (2006.01)
*H04N 21/4788* (2011.01)

(52) U.S. Cl.
CPC .............. *H04N 7/141* (2013.01); *H04N 7/142* (2013.01); *H04N 7/15* (2013.01); *H04N 21/4788* (2013.01)

(58) Field of Classification Search
CPC ......... H04N 21/42204; H04N 21/4126; H04N 5/4403; H04N 5/44582; H04N 21/42684; H04N 21/64322; H04N 7/141; H04N 2005/4407; H04M 1/72533; H04M 1/2535; H04M 1/575
USPC ........ 348/14.01, 14.02; 379/110.01; 455/466
See application file for complete search history.

(56) References Cited

U.S. PATENT DOCUMENTS

| | | | |
|---|---|---|---|
| 5,666,487 A * | 9/1997 | Goodman et al. | 709/246 |
| 5,724,106 A | 3/1998 | Autry et al. | |
| 5,999,207 A | 12/1999 | Rodriguez et al. | |
| 6,791,974 B1 | 9/2004 | Greenberg | |
| 7,142,230 B2 | 11/2006 | Novak et al. | |
| 7,164,435 B2 | 1/2007 | Wang et al. | |
| 7,266,834 B1 * | 9/2007 | Lund et al. | 725/47 |

(Continued)

*Primary Examiner* — Stella Woo
(74) *Attorney, Agent, or Firm* — Jackson Walker L.L.P.

(57) ABSTRACT

A receiver device for use in conjunction with an MCDN includes a computer readable storage resource, a controller to execute stored instructions, a network interface coupling the device to the MCDN, and a decoder to decode streaming multimedia content received via the network interface. The receiver includes a remote control interface to detect a remote control command from a remote control device and a handset interface to communicate audio data with a handset device. A local video interface receives video data from a camera or other local video resource. The stored instructions include, a remote control application to execute remote control commands, a handset module to communicate audio date with the handset device, and a session initiation module to establish a video conferencing session. A video conferencing module integrates the audio data and the video data and communicates the integrated data via the video conferencing session.

10 Claims, 4 Drawing Sheets

(56) References Cited

U.S. PATENT DOCUMENTS

| | | | |
|---|---|---|---|
| 8,330,789 B2* | 12/2012 | Karnalkar et al. | 348/14.04 |
| 8,451,824 B2* | 5/2013 | Underwood et al. | 370/352 |
| 8,601,529 B1* | 12/2013 | Barzegar | H04L 12/12 725/150 |
| 2002/0044199 A1* | 4/2002 | Barzebar et al. | 348/14.01 |
| 2003/0009771 A1* | 1/2003 | Chang | H04N 21/4131 725/135 |
| 2006/0020960 A1 | 1/2006 | Relan et al. | |
| 2006/0041916 A1* | 2/2006 | McQuaide, Jr. | H04M 15/06 725/81 |
| 2007/0127506 A1* | 6/2007 | Absillis | H04L 12/2898 370/401 |
| 2008/0070621 A1* | 3/2008 | Ou Yang et al. | 455/556.1 |
| 2008/0244148 A1* | 10/2008 | Nix et al. | 710/313 |
| 2008/0250358 A1* | 10/2008 | Mitchem et al. | 715/855 |
| 2009/0052863 A1* | 2/2009 | Parmar et al. | 386/83 |

* cited by examiner

INTEGRATED DEVICES FOR MULTIMEDIA CONTENT DELIVERY AND VIDEO CONFERENCING

The present patent application is a continuation of U.S. patent application Ser. No. 11/932,514, filed Oct. 31, 2007, the entirety of which is hereby incorporated by reference.

BACKGROUND

Field of the Invention

The present disclosure relates to multimedia communication networks.

Description of the Related Art

Conventional videophone technology involves a stand-alone transceiver, a display device, and a camera. Because each of these units occupy space and may be relatively expensive, conventional video conferencing implementations are not ideally suited, especially in the consumer market.

DESCRIPTION OF THE EMBODIMENT(S)

Figure 1:
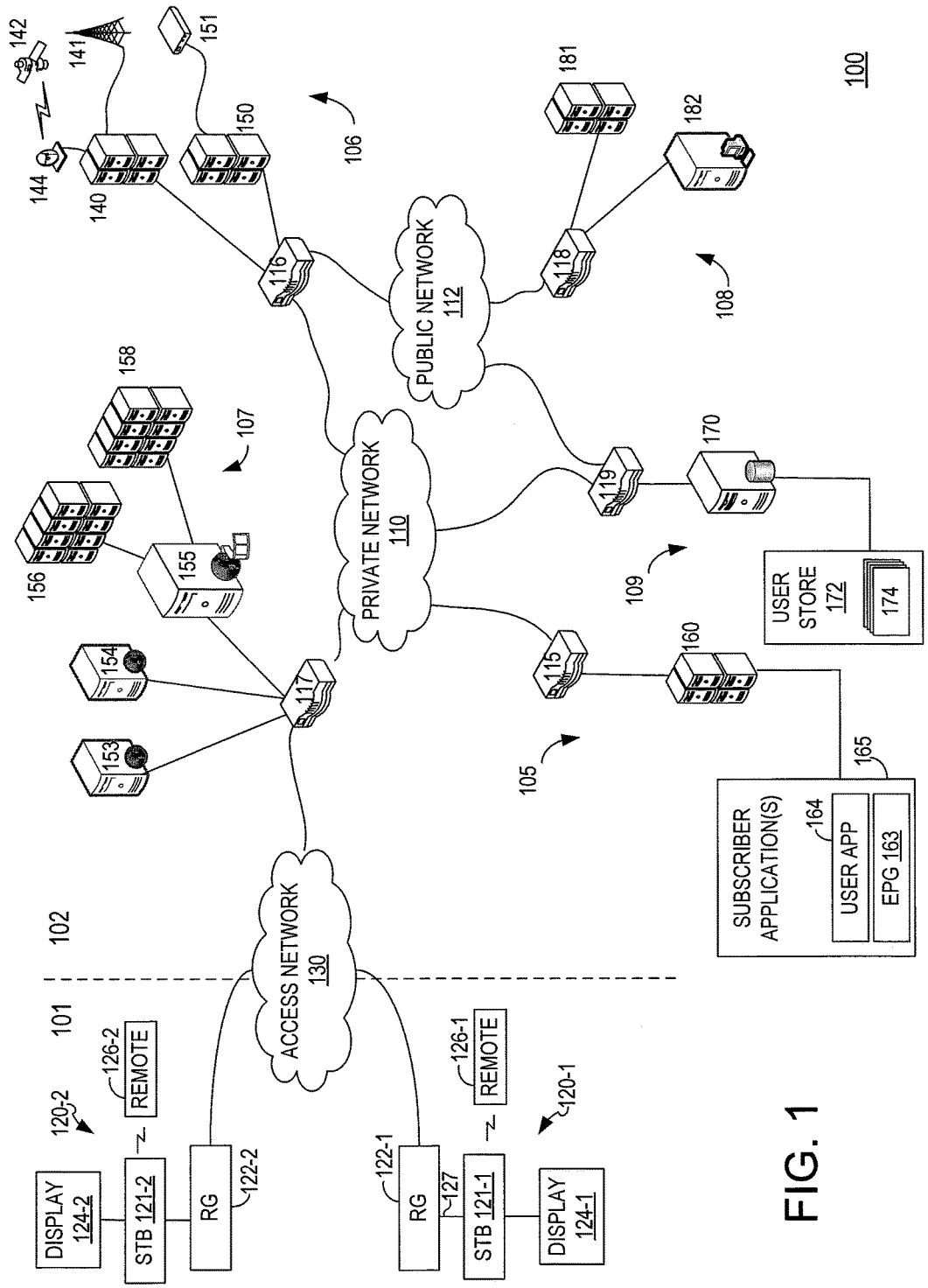
FIG. 1 is a diagram of an implementation of a multimedia content distribution network according to one embodiment.

In one aspect, a receiver device for use in conjunction with a multimedia content distribution network (MCDN) is disclosed. The receiver device includes a computer readable storage resource, a controller to execute stored instructions, a network interface coupling the device to the MCDN, and a decoder to decode streaming multimedia content received via the network interface. The receiver includes a remote control interface to detect a remote control command from a remote control device and a handset interface to communicate audio data with a handset device. The remote control device and the handset device may be integrated within a single physical device. A local video interface receives video data from a camera or other local video resource. The stored instructions include, a remote control application to execute remote control commands, a handset module to communicate audio data with the handset device, and a session initiation module to establish a video conferencing session. A video conferencing module integrates the audio data and the video data and communicates the integrated data via the video conferencing session. The handset module may be operable to communicate digital audio data with the handset device. For example, the handset module may be operable to support a digital enhanced cordless telecommunication (DECT) compliant communication with the handset device. The session initiation module may be implemented with a session initiation protocol (SIP) compliant client. The receiver device may be implemented as a set top box (STB). In these embodiments, the STB is operable to communicate with a residential gateway via a local area network connection. The remote control interface comprises an infrared interface operable to detect infrared signals from the remote control device.

In another aspect, a portable communication device suitable for use in conjunction with an STB is disclosed, where the STB is operably coupled to the MCDN. The communication device includes a set of one or more remote control buttons, a button interface to generate remote control commands responsive to assertion of remote control buttons, a remote control interface to transmit remote control commands to the STB, and a handset interface to communicate audio data with the STB. The portable communication device further includes a microphone operable to convert sound to audio data and to provide the audio data to the handset interface and a speaker operable to convert audio data from the handset interface to sound. The handset interface may be operable to support a DECT compliant connection, or another digital and/or wireless connection with the STB. The portable device may include a small display to display, for example, CallerID information.

In another aspect, a disclosed multimedia service includes providing a subscriber with a STB to receive multimedia content and providing the subscriber with a remote control operable to transmit remote control commands to the STB. The remote control includes a speaker to generate sound and a microphone to receive sound. The STB and the remote control are operable to communicate audio data with each other. The STB is operable to establish a multimedia conferencing session and further operable to transmit and receive video conferencing content via the established session.

In the following description, details are set forth by way of example to facilitate discussion of the disclosed subject matter. It should be apparent to a person of ordinary skill in the field, however, that the disclosed embodiments are exemplary and not exhaustive of all possible embodiments. Throughout this disclosure, a hyphenated form of a reference numeral refers to a specific instance of an element and the un-hyphenated form of the reference numeral refers to the element generically or collectively. Thus, for example, widget 102-1 refers to an instance of a widget class, which may be referred to collectively as widgets 102 and any one of which may be referred to generically as a widget 102.

Before describing details of applications, disclosed herein, for use in conjunction with a multimedia content distribution network, selected aspects of one embodiment of the network and selected devices used to implement the network are described to provide context.

Referring now to the drawings, FIG. 1 illustrates selected aspects of an embodiment of a multimedia content distribution network (MCDN) 100. MCDN 100 is operable for distributing television programs, video on demand content including movies, radio programs including music content, and a variety of other types of multimedia content to multiple subscribers. MCDN 100 as shown includes a client side 101 and a service provider side 102, sometimes referred to herein simply as server side 102. Client side 101 and server side 102 are linked by an access network 130.

Access network 130 connects client side 101 and server side 102. In embodiments of MCDN 100 that leverage telephony hardware and infrastructure, access network 130 may include a "local loop" or "last mile," which refers to the physical connection between a subscriber's home or business and a local exchange. In these embodiments, the physical layer of access network 130 may include twisted pair copper cables, fiber optics cables employed either as fiber to the curb (FTTC) or fiber to the home (FTTH), or another suitable broadband capable medium.

As shown in FIG. 1, client side 101 depicts two of a potentially large number of client(s) 120, each of which may represent a subscriber or subscriber household. Each client 120 as shown in FIG. 1 includes a display 124, a client-side receiver operable to receive and process a multimedia signal, a remote control device 126 operable to communicate with the client-side receiver, and a residential gateway (RG) 122 for interfacing the receiver to access network 130.

In the embodiment depicted in FIG. 1, the client-side receiver is implemented as an STB 121, which is described in greater detail below. In some embodiments, RG 122 may include elements of a broadband modem such as a DSL modem as well as elements of a router and/or access point for a local area network (LAN) 127. In some embodiments, LAN 127 is a wired or wireless Ethernet LAN.

In some embodiments, display 124 is an NTSC and/or PAL compliant display device. STB 121, display 124, or both may include a frequency tuner for use in systems where one or more channels of multimedia content are modulated onto an RF carrier signal and delivered to RG 122. In other embodiments where, for example, multimedia content is delivered to client side 101 as a packet-based stream, frequency tuners may not be required. In these embodiments, clients 120 may support or comply with various network protocols including, as examples, streaming protocols such as RDP (reliable datagram protocol) over UDP/IP (user datagram protocol/internet protocol) as well as more conventional web protocols such as HTTP (hypertext transport protocol) over TCP/IP (transport control protocol).

The elements of server side 102 as depicted in FIG. 1 emphasize various broad categories or "tiers" of devices and/or services desirable for acquiring and delivering multimedia content to a networked base of subscribers. As depicted in FIG. 1, for example, server side 102 includes a multimedia content acquisition tier 106, a multimedia content delivery tier 107, an application tier 105, a database tier 109, and an operations system support (OSS) and business systems support (BSS) tier 108. In the depicted embodiment, each tier 105 through 109 is demarcated by a corresponding routing and switching device 115 through 119, respectively. Routing and switching devices 115 through 119 are referred to herein simply as a switches 115 through 119.

In addition to providing routing and switching functions, switches 115 through 119 may implement hardware and/or software firewalls and/or other security functions (not depicted explicitly) that define at least some of the boundaries of a private network 110. Private network 110 may support any of various existing or future protocols for providing reliable real-time streaming multimedia content including, as examples, real-time transport protocol (RTP), real-time control protocol (RTCP), file transfer protocol (FTP), and real-time streaming protocol (RTSP). In addition, the depicted implementation of MCDN 100 includes switches that connect some of the server-side tiers to a public network 112. As suggested by their names, private network 110 is a restricted access network while public network 112 is a freely accessible network. In some embodiments, public network 112 represents or includes an IP-based network, e.g., the Internet, and private network 110 is another IP-based network. In other embodiments, private network 110 may be any network suitable for transmitting digital video content including, for example, a digital cable-based network, a digital satellite network, and or another suitable network.

Acquisition tier 106 encompasses various devices and/or services to acquire multimedia content, reformat it when necessary, and process it for delivery to subscribers over private network 110 and access network 130. Acquisition tier 106 may include, for example, systems for capturing analog and/or digital content feeds, either directly from a content provider or from a content aggregation facility. Content feeds transmitted via VHF/UHF broadcast signals may be captured by an antenna 141 and delivered to live acquisition server 140. Similarly, live acquisition server 140 may capture down linked signals transmitted by a satellite 142 and received by a parabolic dish 144. In addition, live acquisition server 140 may acquire programming feeds transmitted via high-speed fiber feeds or other suitable transmission means. VoD acquisition server 150 receives content from one or more VoD sources that may be external to the MCDN 100 including, as examples, discs represented by a DVD player 151, or transmitted feeds (not shown). Acquisition resources 106 may further include signal conditioning systems and content preparation systems for encoding content.

After acquiring multimedia content, acquisition tier 106 may transmit acquired content over private network 110, for example, to one or more servers in content delivery tier 107 via content delivery switch 117. The content may be compressed and/or encrypted prior to transmission. In the depicted implementation, content delivery tier 107 includes a content delivery server 155 in communication with a live or real-time content server 156 and a VoD delivery server 158. For purposes of this disclosure, the use of the term "live" or "real-time" in connection with content server 156 is intended primarily to distinguish the applicable content from the content provided by VoD delivery server 158. The content provided by a VoD server is sometimes referred to as time-shifted content to emphasize the ability to obtain and view VoD content substantially without regard to the time of day or day of week.

Content delivery tier 107 includes devices and/or services that are, in some embodiments, responsible for creating video streams, e.g., MPEG-2 video streams, suitable for transmission over private network 110 and/or access network 130 to clients 120. The video streams may be "packetized" video streams comprised of multiple network data packets. Content delivery server 155 may employ unicast and broadcast techniques when making content available to a subscriber.

Client-facing switch 113 as shown is further coupled to a client gateway 153 and a terminal server 154 that is operable to provide terminal devices with a connection point to the private network 110. Client gateway 153 may provide subscriber access to private network 110 and the resources coupled thereto. Client gateway 153 may also prevent unauthorized devices, such as hacker computers or stolen set-top boxes, from accessing the private network 110. Accordingly, in some embodiments, when an STB 121 accesses MCDN 100, client gateway 153 verifies subscriber information by communicating with user store 172 via the private network 110.

MCDN 100 as depicted includes application resources 105, which communicate with private network 110 via application switch 115. Application resources 105 as shown include an application server 160 operable to host or otherwise facilitate one or more subscriber applications 165 that may be made available to system subscribers. For example, subscriber applications 165 as shown include an electronic programming guide (EPG) application 163.

Application server 160 as shown also hosts an application referred to generically as user application 164. User application 164 represents or encompasses an application that may deliver a value added feature to subscribers. User application 164 is included in FIG. 1 to emphasize the ability to extend the network's functionality via network hosted applications.

As shown in FIG. 1, a database switch 119 connects database tier 109 to private network 110 and to public network 112. Database tier 109 as shown includes a database server 170 that manages a system storage resource 172, also referred to herein as user store 172. User store 172 as shown includes one or more user profiles 174. In some embodiments, user profiles 174 include account information and subscriber preference information pertaining to a corresponding subscriber. User profiles 174 may be accessed by applications executing on application server 160 and/or applications executing locally on a client 120, e.g., executing on STB 121.

MCDN 100 as shown includes OSS/BSS tier 108 connected to public network 112 via OSS/BSS switch 118. OSS/BSS tier 108 as shown includes an OSS/BSS server 181 that hosts operations support services including remote management via a management server 182. OSS/BSS resources 108 may include a monitoring server (not depicted) that monitors network devices within or coupled to MCDN 100 via, for example, a simple network management protocol (SNMP).

Figure 2:
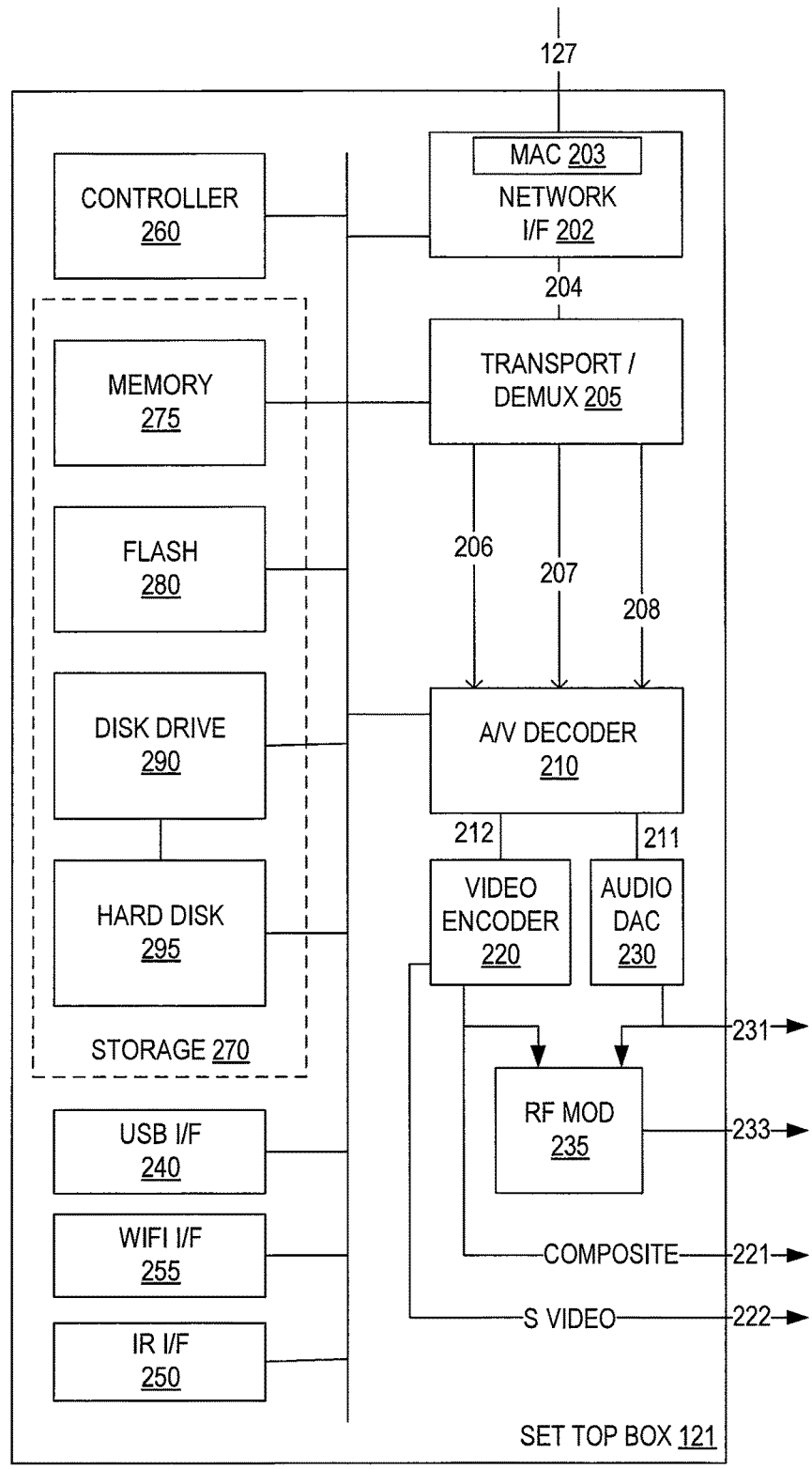
FIG. 2 is a block diagram of selected elements of a set top box suitable for use in the network of FIG. 1.

Turning now to FIG. 2, selected components of one embodiment of the STB 121 depicted in FIG. 1 are illustrated. Some embodiments of STB 121 include hardware and/or software functionality to receive streaming multimedia data from an IP-based network and process the data to produce video and audio signals suitable for delivery to an NTSC, PAL, or other type of display 124. In addition, some embodiments of STB 121 may include resources to store multimedia content locally and resources to play back locally stored multimedia content when requested.

In the embodiment depicted in FIG. 2, STB 121 includes a general purpose processing core represented as controller 260 in communication with various special purpose multimedia modules. These modules may include a transport/demultiplexer module 205, an A/V decoder 210, a video encoder 220, an audio DAC 230, and an RF modulator 235. Although FIG. 2 depicts each of these modules discretely, STB 121 may be implemented with a system on chip (SoC) device that integrates controller 260 and each of these multimedia modules. In still other embodiments, STB 121 may include an embedded processor serving as controller 260 and at least some of the multimedia modules may be implemented with a general purpose digital signal processor (DSP) and supporting software.

Regardless of the implementation details of the multimedia processing hardware, STB 121 as shown in FIG. 2 includes a network interface 202 that enables STB 121 to communicate with an external network such as LAN 127. Network interface 202 may share many characteristics with conventional network interface cards (NICs) used in personal computer platforms. For embodiments in which LAN 127 is an Ethernet LAN, for example, network interface 202 implements level 1 (physical) and level 2 (data link) layers of a standard communication protocol stack by enabling access to twisted pair, fiber, or other form of physical network medium and by supporting low level addressing using MAC addressing. In these embodiments, every network interface 202 includes a globally unique 48-bit MAC address 203 stored in a ROM or other persistent storage element of network interface 202. Similarly, at the other end of the LAN connection 127, RG 122 has a network interface (not depicted) with its own globally unique MAC address.

Network interface 202 may further include or support software or firmware providing one or more complete network communication protocol stacks. Where network interface 202 is tasked with receiving streaming multimedia communications, for example, network interface 202 may include a streaming video protocol stack such as an RTP/UDP stack. In these embodiments, network interface 202 is operable to receive a series of streaming multimedia packets and process them to generate a digital multimedia stream 204 that is provided to transport/demux 205.

The digital multimedia stream 204 is a sequence of digital information that may include video data streams interlaced with audio data streams. The video and audio data contained in digital multimedia stream 204 may be referred to as "in-band" data. Multimedia stream 204 may also include "out-of-band" data, which might include, for example, billing data, decryption data, and data enabling the IPTV service provider to manage IPTV client 120 remotely.

Transport/demux 205 as shown is operable to segregate and, if needed, decrypt the audio, video, and any out-of-band data in digital multimedia stream 204. Transport/demux 205 outputs a digital audio stream 206, a digital video stream 207, and an out-of-band digital stream 208 to A/V decoder 210. Transport/demux 205 may also, in some embodiments, support or communicate with various peripheral interfaces of STB 121 including an IR interface 250 suitable for use with an IR remote control unit (not shown) and a front panel interface (not shown).

A/V decoder 210 processes digital audio, video, and out-of-band streams 206, 207, and 208 to produce a native format digital audio stream 211 and a native format digital video stream 212. A/V decoder 210 processing may include decompression of digital audio stream 206 and/or digital video stream 207, which are generally delivered to STB 121 as compressed data streams. In some embodiments, digital audio stream 206 and digital video stream 207 are MPEG compliant streams and, in these embodiments, A/V decoder 210 is an MPEG decoder.

The native format digital audio stream 211 as shown in FIG. 2 is routed to an audio DAC 230 to produce an audio output signal 231. The native format digital video stream 212 is routed to an NTSC/PAL or other suitable video encoder 220, which generates digital video output signals suitable for presentation to an NTSC or PAL compliant display device 204. In the depicted embodiment, for example, video encoder 220 generates a composite video output signal 221 and an S video output signal 222. An RF modulator 235 receives the audio and composite video outputs signals 231 and 221 respectively and generates an RF output signal 221 suitable for providing to an analog input of display 204.

In addition to the multimedia modules described, STB 121 as shown includes various peripheral interfaces. STB 121 as shown includes, for example, a USB interface 240, an interface 255 for communicating with a telephony handset, and a local video interface 256 for receiving video data from a camera 258 or another source of local video data. The illustrated embodiment of STB 121 includes storage resources 270 that are accessible to controller 260 and possibly one or more of the multimedia modules. Storage 270 may include DRAM or another type of volatile storage identified as memory 275 as well as various forms of persistent or nonvolatile storage including flash memory 280 and/or other suitable types of persistent memory devices including ROMs, EPROMs, and EEPROMs. In addition, the depicted embodiment of STB 121 includes a mass storage device in the form of one or more magnetic hard disks 295 supported by an IDE compliant or other type of disk drive 290. Embodiments of STB 121 employing mass storage devices may be operable to store content locally and play back stored content when desired.

Figure 3:
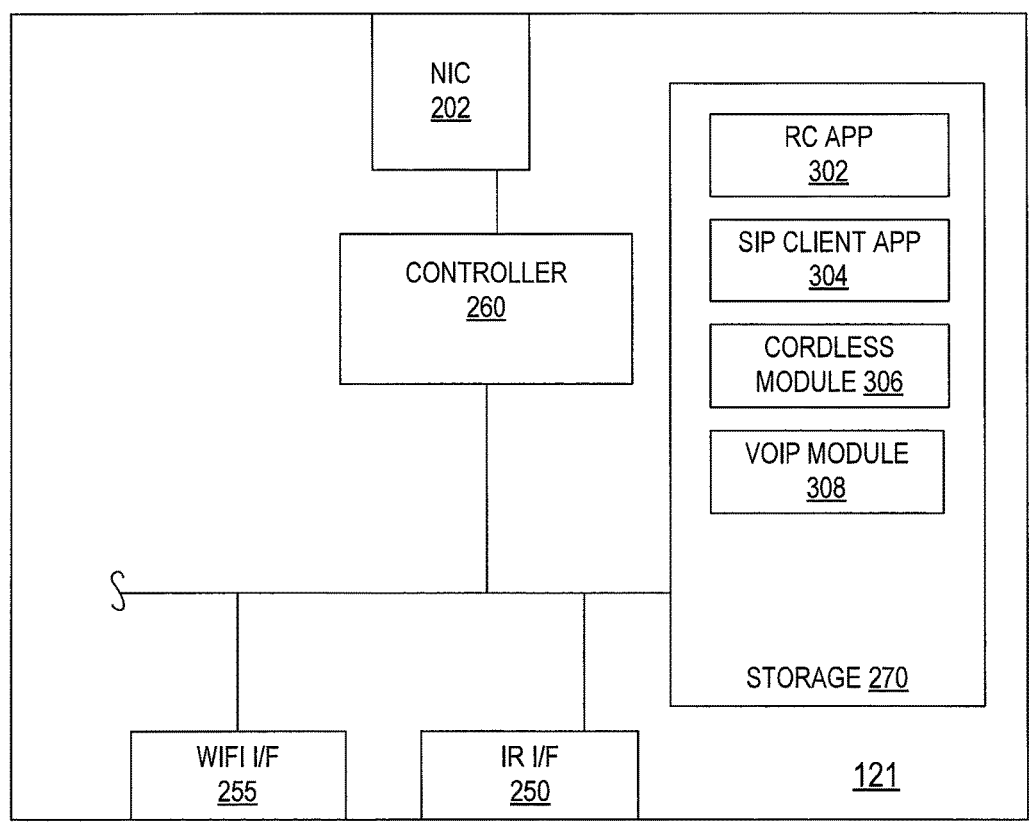
FIG. 3 is a block diagram of an embodiment of the set top box of FIG. 2 emphasizing video conferencing functionality.

Turning now to FIG. 3, selected elements of an embodiment of STB 121 are depicted to emphasize video conferencing functionality. As depicted in FIG. 3, STB 121 includes various software modules 302 through 310 to support video conferencing functionality. The software modules represent computer executable instructions embedded in one or more of the storage components of storage 270. As shown in FIG. 3, the software modules include a remote control application 302, a SIP client application 304, a handset module 306, a video conferencing module 308, and a camera module 310.

Remote control application 302 represents code operable to execute a remote control initiated function in response to a subscriber or other user asserting a remote control button on the remote control device 126. Remote control application 126 may include or have access to a table indicating procedures to execute in response to assertion of applicable remote control buttons. In some embodiments, remote control commands are received by STB 121 via its RC interface 250, which may be an infrared or other form of wireless communication interface.

In the depicted embodiment, STB 121 is operable, not only to participate in a multimedia conferencing session, but also to establish the session for itself and one or more external devices. STB 121 as depicted in FIG. 3, for example, includes a SIP client application 304. SIP is a protocol for establishing a multimedia session and SIP client application 304 is compliant with the SIP protocol. Integrating the SIP client application 304 into STB 121 beneficially simplifies the implementation of hardware needed to support video conferencing.

Handset module 306 enables STB 121 to communicate video conferencing audio data with a handset device. In some embodiments, the handset device is integrated within the remote control device 126 so that the STB 121 and remote control device 126 are operable to communicated audio data with each other. In some embodiments, the audio data is communicate wirelessly and/or digitally between STB 121 and remote control device 126. Camera module 310 is executed by controller 260 to process video information received from local video input interface 256. Video conferencing module 308 supports video conferencing functionality by being operable to integrate audio data from remote control device 126 and video data from camera 258 into multimedia data and being further operable to transmit and received multimedia data via the established video conferencing session.

Figure 4:
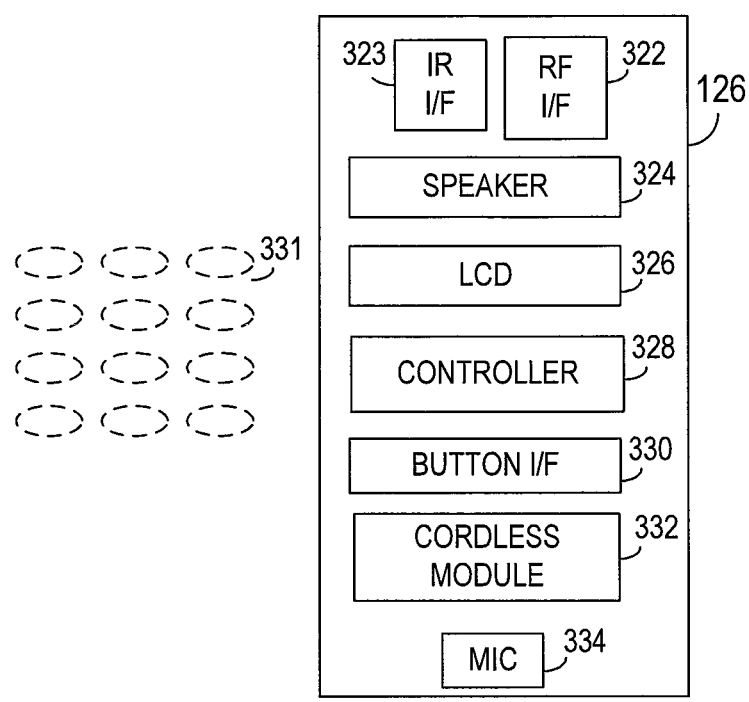
FIG. 4 is a block diagram of an embodiment of a remote control/handset device emphasizing video conferencing functionality.

Referring now to FIG. 4, selected elements of an embodiment of remote control 126 are depicted to emphasize the dual functionality of remote control device 126 as a remote and a video conferencing handset. In the depicted embodiment, remote control device 126 includes a remote control interface 323, a handset interface 322, a speaker 324, an LCD 326, a controller 328, button interface 330, a set of buttons 331, which are shown with dashed lines and transposed relative to remote control device 126 for the sake of clarity, a cordless module 332, and a microphone 334. Microphone 334 converts sound to audio data for transmission while speaker 324 converts received audio data to sound. Button I/F 330 and RC interface 323 enable remote control device 126 to transmit remote control commands wirelessly to STB 121 via an infrared or other wireless signal.

Handset interface 322, in conjunction with cordless module 332, is operable to communicate audio data with STB 121. In one embodiment, cordless module 332 is a DECT compliant module that enables remote control device 126 to communicate audio data using DECT compliant connections with STB 121 serving as the DECT base station. LCD 326 may be used in conjunction with this embodiment to display DECT information including, for example, CallerID information.

In one particular implementation, STB 121 is operable as a DECT base station and remote control 126 is operable as a DECT handset. DECT functionality enables the implementation of beneficial features. For example, multiple DECT handsets can register with a single DECT base station and thereby communicate audio data to a designated base station. A subscriber with multiple STBs could designate one of the STBs as the video conferencing STB, establish that STB as the DECT base station, and register all of his or her remote controls with the designated STB for telecommunications purposes. In addition, DECT supports the transmission of information including CallerID information between a base station and a handset. If remote control device 126 is implemented within a display device such as a liquid crystal display, it could display CallerID information when an incoming call is received.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:
1. A receiver device, comprising:
   a controller;
   a network interface device, including a unique media access control address, for connecting the receiver device to a local area network;
   a decoder for decoding streaming multimedia content received via the network interface device, wherein decoding the streaming multimedia content includes one of:
      decompressing at least a portion of the streaming multimedia content;
      decrypting at least a portion of the streaming multimedia content; and
      decompressing and decrypting at least a portion of the streaming multimedia content;
   a radio frequency modulator for:
      receiving an analog audio signal and a composite video signal generated from audio and video outputs of the decoder; and
      generating a radio frequency output signal suitable for providing to an analog input of a display device;
   a remote control interface to detect a remote control command from a remote control device;
   a handset interface to communicate audio data with a handset device;
   a local video interface to receive local video data from a camera;

a demultiplexer configured for:
receiving the streaming multimedia content from the network interface device;
providing a digital audio stream to an audio decoder;
providing a digital video stream to a video decoder; and
generating out-of-band data including at least one of: billing data and decryption information; and
a computer readable storage medium, accessible to the processor, including controller executable instructions, which when executed by the controller, cause the controller to perform operations, comprising:
executing remote control commands received via the remote control interface;
supporting a telephone connection via the handset interface; and
integrating the audio data and the local video data into multimedia data to support a video conference call.

2. The device of claim 1, wherein the operations include communicating digital audio data with the handset device.

3. The device of claim 1, wherein supporting the telephone interface includes supporting a session initiation protocol compliant client.

4. The device of claim 1, wherein the receiver device comprises a set top box.

5. The device of claim 4, wherein the operations include communicating with a residential gateway via the local area network connection coupling the local area network to an access network.

6. A set top box, comprising:
a controller;
a network interface device for receiving streaming multimedia content from an access network;
an infrared interface to receive an infrared remote control command signal from a remote device;
a radio frequency interface to:
communicate digital audio data associated with a telephone call to the remote device; and
transmit caller identification information associated with the telephone call to the remote device; and
a radio frequency modulator for:
receiving an analog audio signal and a composite video signal generated from audio and video outputs of the decoder; and
generating a radio frequency output signal suitable for providing to an analog input of a display device;
a computer readable storage medium, accessible to the processor, storing controller executable instructions, which when executed by the controller cause the controller to perform operations, comprising:
decoding streaming video content included in the multimedia content, wherein decoding includes decompressing at least a portion of the streaming video content;
demultiplexing the streaming multimedia content, wherein said demultiplexing includes:
receiving the streaming multimedia content from the network interface device;
providing a digital audio stream to an audio decoder;
providing a digital video stream to a video decoder; and
executing remote control commands received via the remote device;
supporting a telephone connection via the radio frequency interface;
receiving local video data from a camera; and
integrating the digital audio data and the local video data into multimedia data to support a multimedia conference session with the remote control device; and
generating out-of-band data including at least one of: billing data and decryption information.

7. The set top box of claim 6, wherein supporting the telephone connection includes supporting a digital enhanced cordless telecommunication connection.

8. The set top box of claim 7, wherein the radio frequency interface is configured to communicate the digital audio data via a carrier signal frequency within a carrier frequency band selected from the group of carrier frequency bands consisting of:
a 902 MHz to 928 MHz carrier frequency band; and
a 1920 MHz to 1930 MHz carrier frequency band.

9. The set top box of claim 6, wherein the operations include:
supporting digital enhanced cordless telecommunication base station functions for the remote device.

10. The set top box of claim 9, wherein supporting the digital enhanced cordless telecommunication base station functions includes:
registering a plurality of remote devices with the set top box as the base station.

* * * * *

UNITED STATES PATENT AND TRADEMARK OFFICE
CERTIFICATE OF CORRECTION

PATENT NO. : 9,843,765 B2
APPLICATION NO. : 13/689360
DATED : December 12, 2017
INVENTOR(S) : Anup D. Karnalkar and Jyotindra N. Shah It is certified that error appears in the above-identified patent and that said Letters Patent is hereby corrected as shown below:

In the Claims

Column 9, Line 30 through Column 10, Line 26 Please amend Claim 6 as follows:

6. A set top box, comprising:
a controller;
a network interface device for receiving streaming multimedia content from an access network;
an infrared interface to receive an infrared remote control command signal from a remote device;
a radio frequency interface to:
    communicate digital audio data associated with a telephone call to the remote device; and
    transmit caller identification information associated with the telephone call to the remote device; and
a radio frequency modulator for:
    receiving an analog audio signal and a composite video signal generated from audio and video outputs of the decoder; and
    generating a radio frequency output signal suitable for providing to an analog input of a display device;
a computer readable storage medium, accessible to the processor, storing controller executable instructions, which when executed by the controller cause the controller to perform operations, comprising:
    decoding streaming video content included in the multimedia content, wherein decoding includes decompressing at least a portion of the streaming video content;
    demultiplexing the streaming multimedia content, wherein said demultiplexing includes:
        receiving the streaming multimedia content from the network interface device;
        providing a digital audio stream to an audio decoder;
        providing a digital video stream to a video decoder; and
    executing remote control commands received via the remote device;
    supporting a telephone connection via the radio frequency interface;
    receiving local video data from a camera; and Signed and Sealed this
Sixth Day of February, 2018

Joseph Matal
*Performing the Functions and Duties of the*
*Under Secretary of Commerce for Intellectual Property and*
*Director of the United States Patent and Trademark Office* integrating the digital audio data and the local video data into multimedia data to support a multimedia conference session with the remote device; and
generating out-of-band data including at least one of: billing data and decryption information.